(12) United States Patent
Richter

(10) Patent No.: US 11,511,676 B2
(45) Date of Patent: Nov. 29, 2022

(54) VEHICLE STORAGE SYSTEM

(71) Applicant: Burke Lee Richter, Ulysses, KS (US)

(72) Inventor: Burke Lee Richter, Ulysses, KS (US)

( * ) Notice: Subject to any disclaimer, the term of this patent is extended or adjusted under 35 U.S.C. 154(b) by 0 days.

(21) Appl. No.: 16/974,104

(22) Filed: Sep. 30, 2020

(65) Prior Publication Data
US 2022/0097615 A1 Mar. 31, 2022

(51) Int. Cl.
*B60R 9/06* (2006.01)
*B60J 5/10* (2006.01)

(52) U.S. Cl.
CPC .. *B60R 9/06* (2013.01); *B60J 5/10* (2013.01)

(58) Field of Classification Search
CPC ....... B60R 9/06; B60R 13/02; B62D 33/0273; B62D 33/03; B60J 5/10; B60P 1/435
See application file for complete search history.

(56) References Cited

U.S. PATENT DOCUMENTS

| | | | | |
|---|---|---|---|---|
| 4,864,673 | A * | 9/1989 | Adaway | B60P 1/435 14/71.1 |
| 5,236,242 | A * | 8/1993 | Seeman | B62D 35/001 296/180.1 |
| 5,244,335 | A * | 9/1993 | Johns | B60P 1/435 296/61 |
| 5,273,335 | A * | 12/1993 | Belnap | B62D 33/0273 14/71.1 |
| 5,312,149 | A * | 5/1994 | Boone | B62D 33/0273 296/61 |
| 5,320,397 | A * | 6/1994 | Peterson | B62D 33/0273 296/180.1 |
| 5,518,158 | A * | 5/1996 | Matlack | B60R 9/00 224/402 |
| 5,536,058 | A * | 7/1996 | Otis | B60P 1/435 296/61 |
| 5,803,523 | A * | 9/1998 | Clark | B60P 1/435 14/71.1 |
| 6,206,252 | B1 * | 3/2001 | Broadus | B60P 3/2205 222/608 |
| 6,364,391 | B1 * | 4/2002 | Everett | B60N 2/24 296/51 |
| 6,454,338 | B1 * | 9/2002 | Glickman | B60P 1/435 296/26.1 |
| 6,834,903 | B2 * | 12/2004 | Harper | B62D 33/03 296/51 |
| 6,905,158 | B1 * | 6/2005 | Bastian | B60R 3/02 280/164.1 |
| 6,918,624 | B2 * | 7/2005 | Miller | B60P 3/40 182/127 |

(Continued)

*Primary Examiner* — Brian D Nash
(74) *Attorney, Agent, or Firm* — Ryan M. Fountain

(57) ABSTRACT

A vehicle storage system is provided having closable storage container which is slidably and removably mounted in a vehicle tailgate, the cover portion of which can serve as a work surface extension of the tailgate, and the interior of which contains reconfigurable dividing walls for separation of contents into discrete locations during both use and storage. One or more of these containers can be mounted, stacked or side by side, within an interior cavity of the tailgate or of a tailgate segment, that tailgate being lockable and removable from the vehicle. Full extension of the storage container from the tailgate interior can be achieved by a double draw slide mechanism. The tailgate end cover is enlarged for both aesthetic and supplemental support surface purposes.

11 Claims, 9 Drawing Sheets

(56) References Cited

U.S. PATENT DOCUMENTS

| | | | | |
|---|---|---|---|---|
| 6,932,404 B2* | 8/2005 | Vejnar | B62D 33/0273 | 296/26.09 |
| 6,957,840 B1* | 10/2005 | Endres | B62D 33/0273 | 296/26.08 |
| 6,991,277 B1* | 1/2006 | Esler | B60P 1/435 | 296/26.08 |
| 6,994,363 B2* | 2/2006 | Seksaria | B60P 3/40 | 280/166 |
| 7,090,276 B1* | 8/2006 | Bruford | B60R 3/02 | 296/1.02 |
| 7,234,749 B1* | 6/2007 | Firzlaff | B62D 33/0273 | 296/26.08 |
| 7,261,357 B1* | 8/2007 | Bechen | B60R 3/02 | 296/57.1 |
| 7,287,798 B2* | 10/2007 | King | B60P 3/40 | 296/57.1 |
| 7,401,833 B2* | 7/2008 | Dryja | B62D 33/0273 | 296/61 |
| 7,513,552 B2* | 4/2009 | Carvalho | B60P 1/431 | 296/26.09 |
| 7,549,692 B2* | 6/2009 | Washington | B60P 1/435 | 296/61 |
| 7,628,439 B1* | 12/2009 | Strong | B62D 33/0273 | 108/44 |
| 7,712,811 B2* | 5/2010 | Heaman | B62D 33/0273 | 296/26.08 |
| 7,834,750 B1* | 11/2010 | Hertz | B60Q 1/2692 | 340/468 |
| 8,348,325 B2* | 1/2013 | Hausler | B62D 33/0273 | 296/51 |
| 8,919,853 B2* | 12/2014 | Krishnan | B60R 3/02 | 296/62 |
| 9,387,812 B2* | 7/2016 | Bexar | B62D 33/023 | |
| 9,994,263 B1* | 6/2018 | Richter | B60P 1/435 | |
| 10,005,396 B2* | 6/2018 | Spahn | B62D 33/03 | |
| 10,106,087 B2* | 10/2018 | Stojkovic | B60P 3/14 | |
| 10,106,208 B2* | 10/2018 | Barrios Albert | B60R 3/02 | |
| 10,464,618 B2* | 11/2019 | Loew | B62D 33/03 | |
| 10,543,789 B1* | 1/2020 | Hemphill | B62D 33/0273 | |
| 10,994,660 B2* | 5/2021 | Ngo | B62D 33/03 | |
| 2009/0108614 A1* | 4/2009 | Washington | B60P 1/435 | 296/61 |
| 2015/0102624 A1* | 4/2015 | Kmita | B60R 9/06 | 296/37.6 |
| 2017/0291551 A1* | 10/2017 | Krajenke | B60R 3/02 | |
| 2018/0043831 A1* | 2/2018 | Stojkovic | B60P 3/14 | |

* cited by examiner

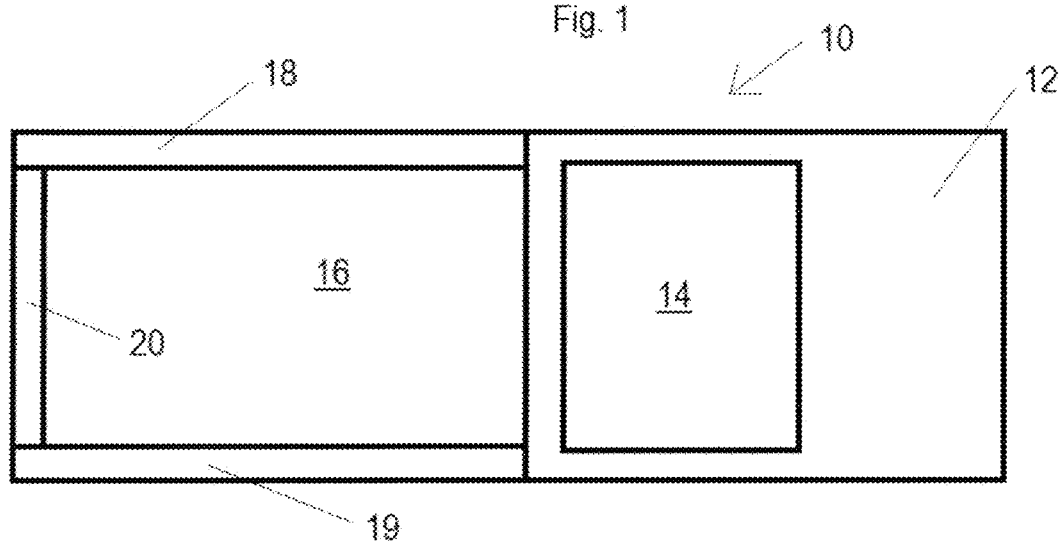
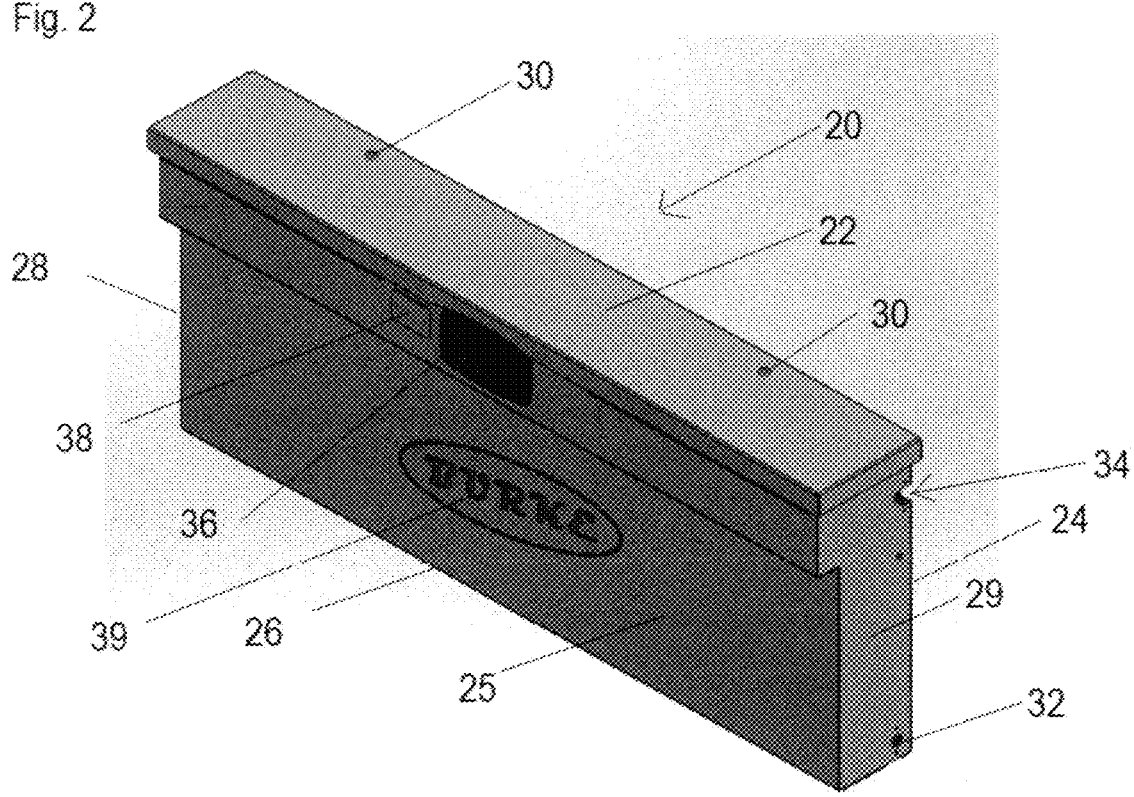

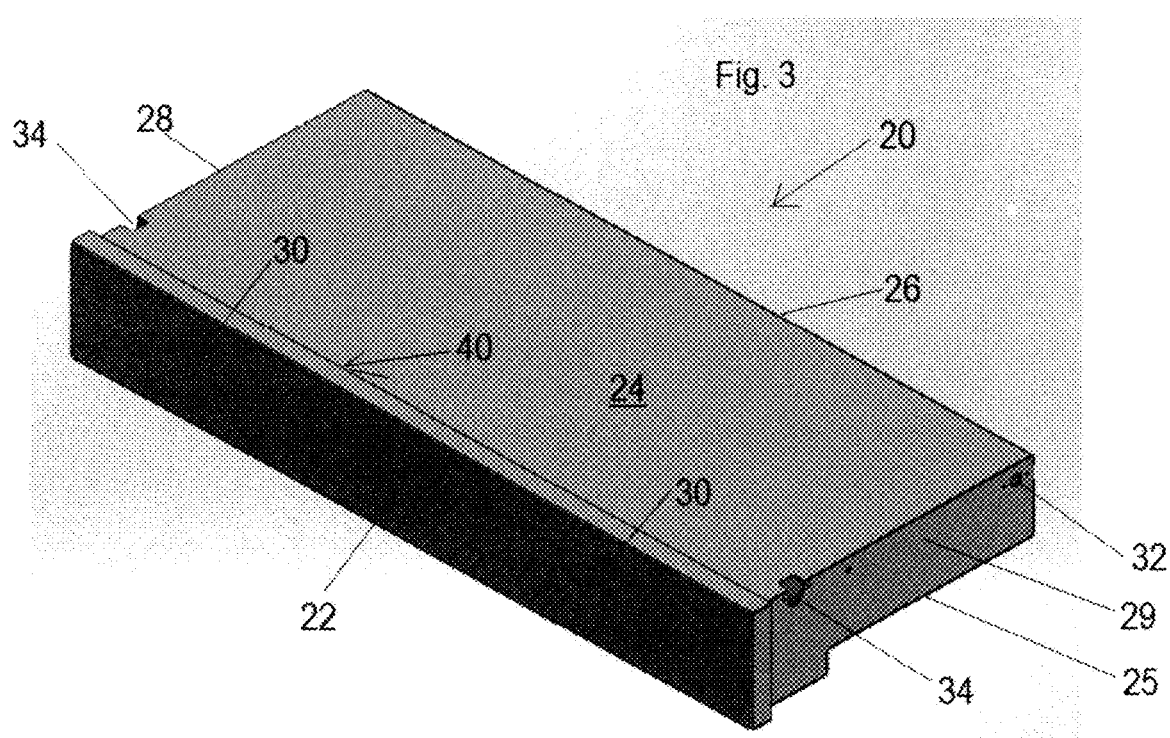

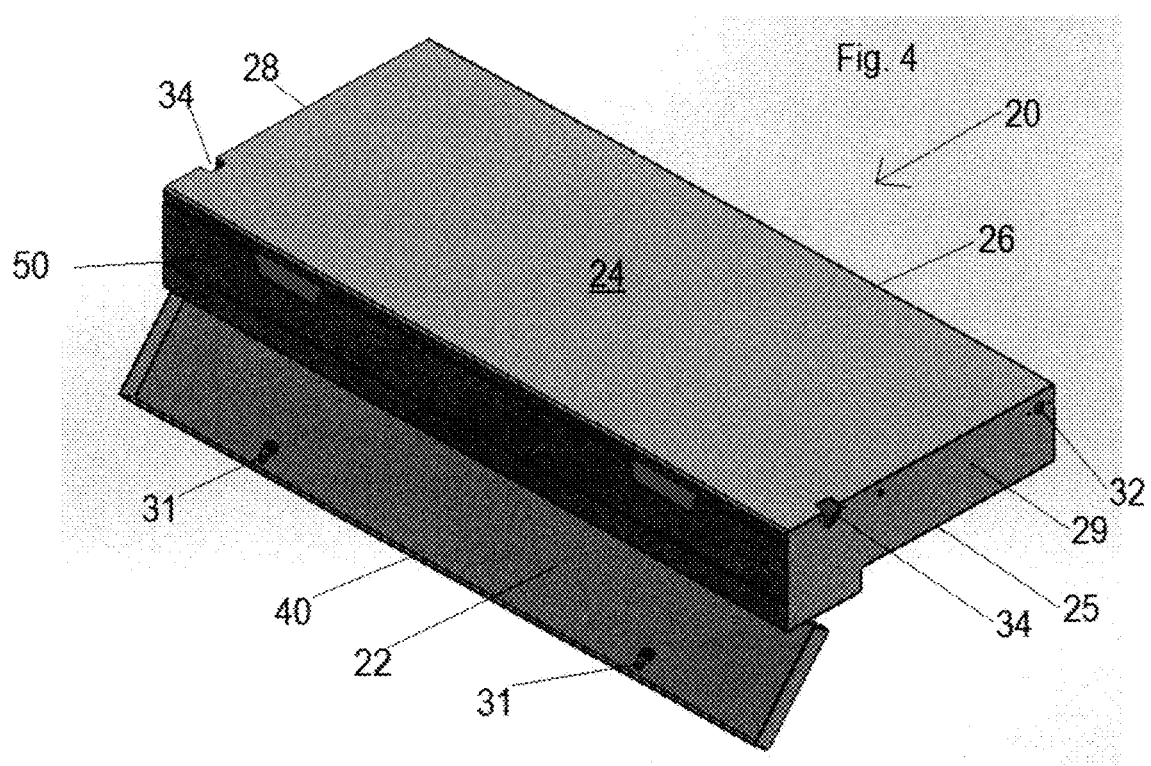

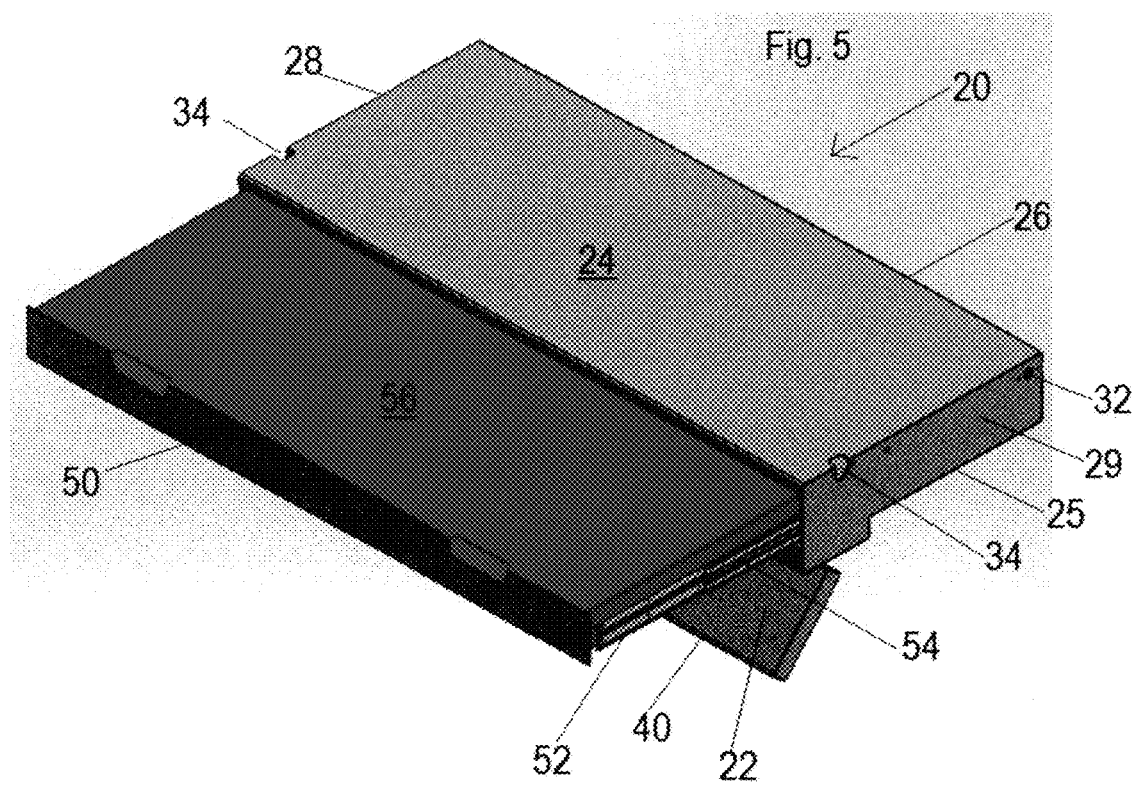

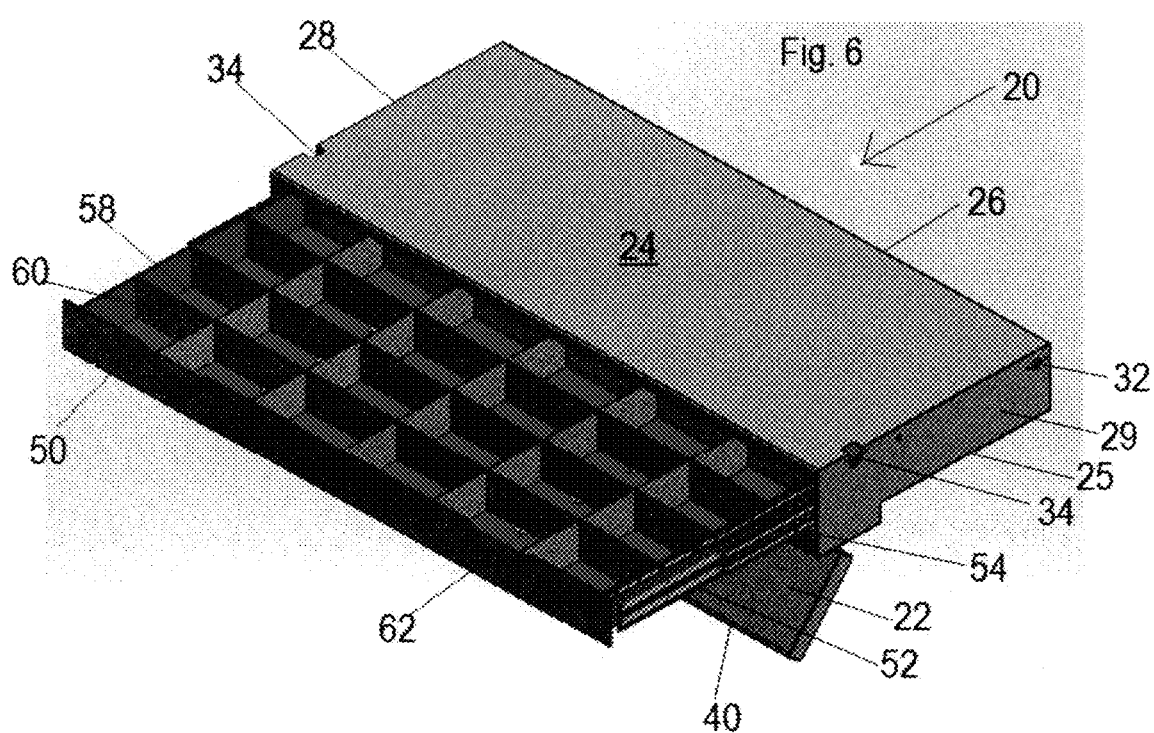

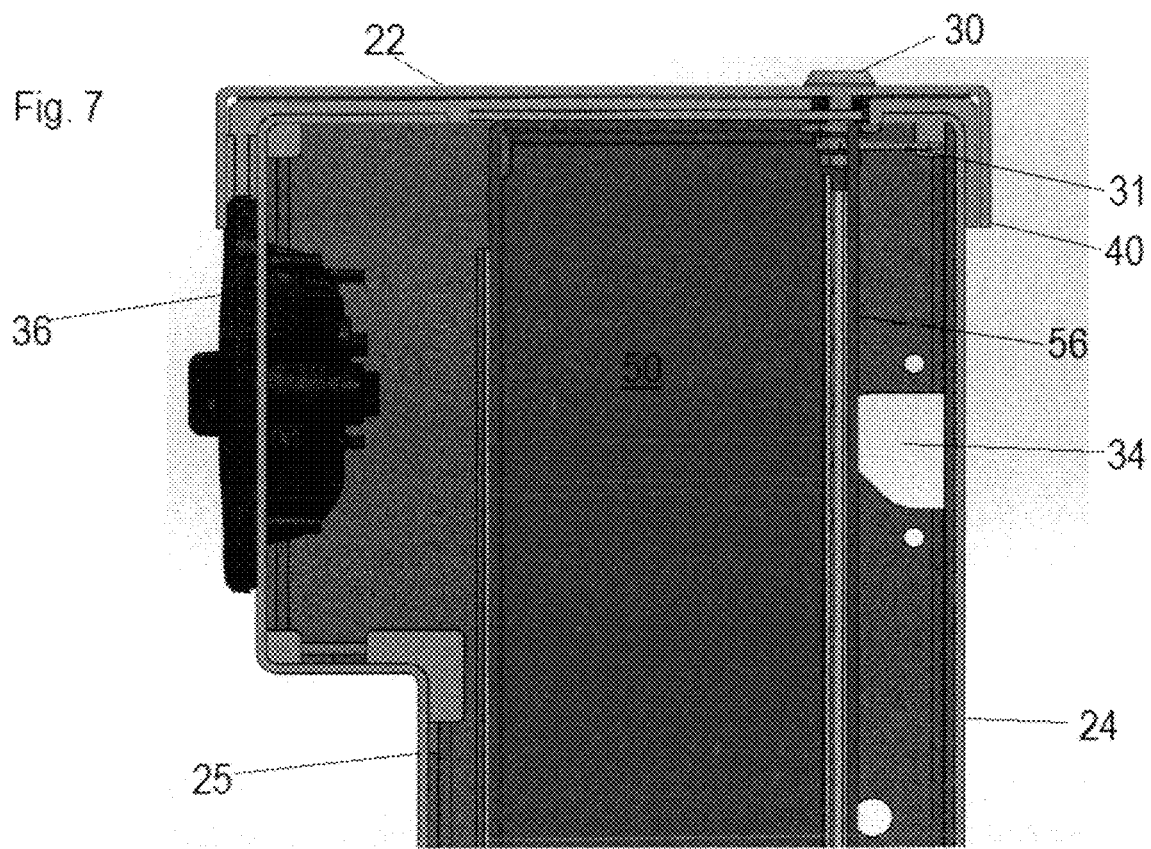

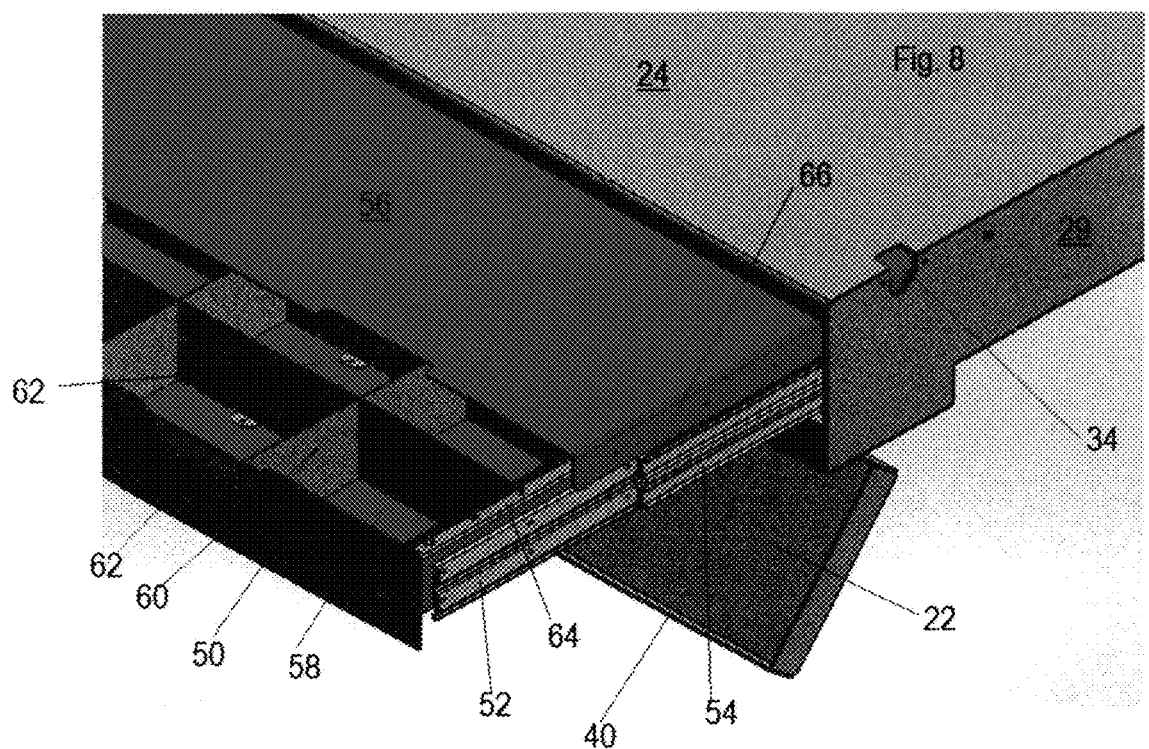

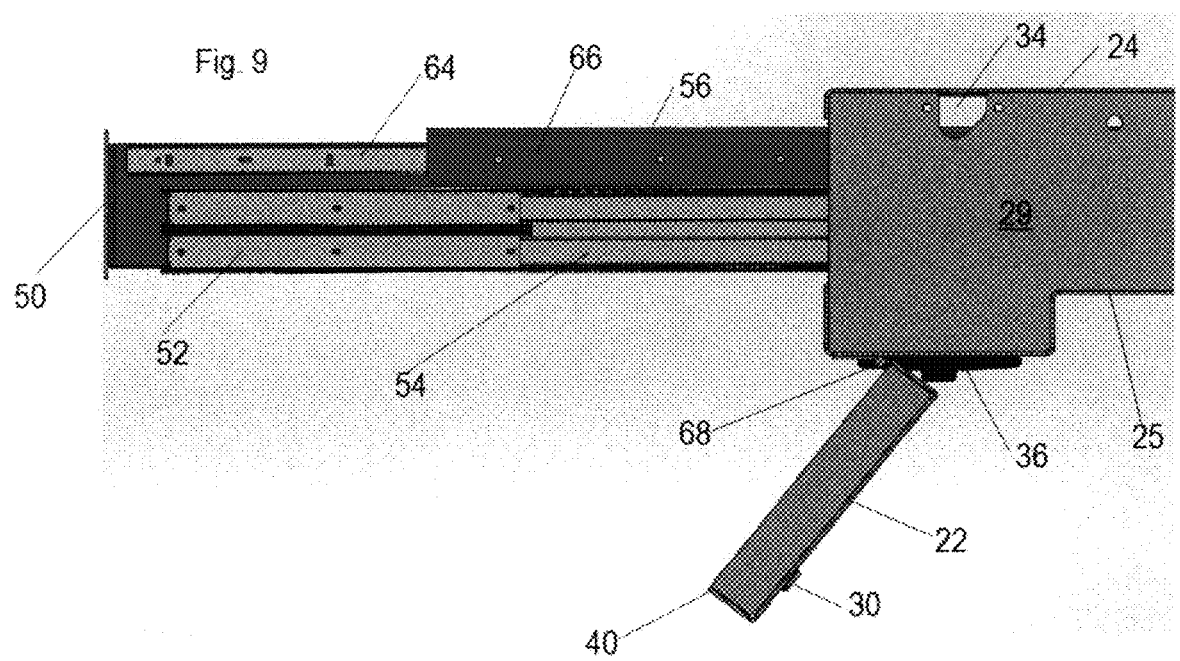

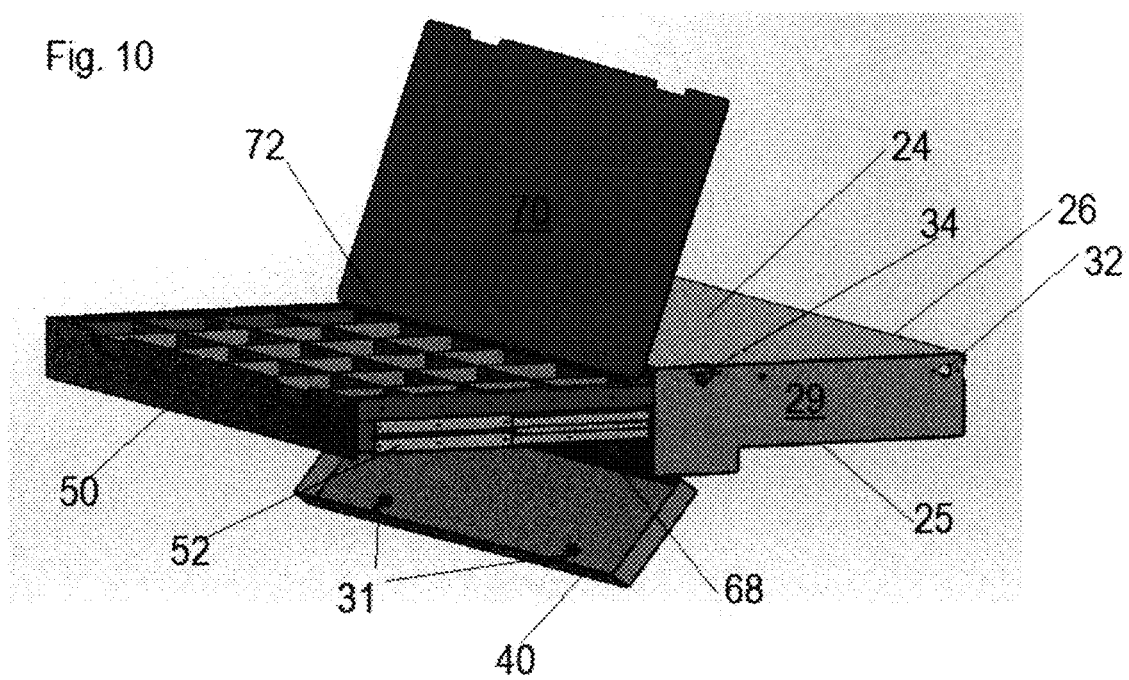

VEHICLE STORAGE SYSTEM

The present invention claims priority from Provisional Patent Application No. 62/908,721, filed on Oct. 1, 2019, to the fullest extent permitted by law, and incorporates by reference all of that disclosure, as set forth in the attachment hereto.

The present invention is an improvement upon the prior invention set forth by the Applicant in U.S. Pat. No. 9,994,263, issued on Jun. 12, 2018 to the same inventor as the present Applicant.

BACKGROUND OF THE INVENTION

The present invention relates generally to vehicle storage systems, and, more particularly, to utility storage systems for use with pick-up trucks and other vehicles having a tailgate and/or drop down side walls adjacent a cargo bed of the vehicle. It has been found that there are typically various competing or conflicting considerations when designing, constructing, and using storage systems for use with vehicles, and particularly when applying such systems to vehicles having tailgates.

In general, vehicles (such as pick-up trucks) are well-known, and are formed to have a rearward cargo bed surrounded by side walls and accessed by a rear tailgate. The tailgate is usually hinged or pivotally attached to the vehicle so as to drop down rearwardly to open and fold upwardly to close. In the open position, the tailgate provides a generally horizontal wall which can form a support surface extension for items carried into or transported on the cargo bed. In the closed position, the tailgate provides a generally vertical wall which can restrict movement of items out of the cargo bed.

In workplace applications, such as the construction industry, it is often advantageous to carry numerous tools, parts, and equipment within vehicles, such as pick-up trucks, on a regular basis. These items often need to be easily removable from the vehicle and readily accessible within the vehicle for authorized use, as well as securable against unauthorized use or removal from the vehicle. Further, it is open advantageous for such vehicles to have supplemental work surfaces readily available when needed, so as to support the use these items being carried. Various solutions have been proposed for both types of needs previously, but those typically have added excessive cost and/or weight to the vehicle, and/or taken up to much usable space from other portions of the vehicle.

Further, tailgates for vehicles typically need to be readily removable to facilitate extra vehicle utility and/or to reduce fuel costs, especially when the cargo bed is not in use. At the same time, it has been suggested that tailgates can be used to house a variety of features adding to vehicle functionality, such as back-up cameras and loading ramps. Further, and especially when caps or covers are applied to or over the cargo bed, it has been found desirable to install various locking mechanisms within tailgates. These extra features for tailgates have tended to complicate tailgate construction, and take up space within the tailgate body, as well as increase construction costs and weight of tailgates.

A wide variety of portable toolboxes and utility containers have been suggested for use with or within vehicles, in the prior art. It can be a challenge for certain prior devices to maintain their contents in discrete locations within the container, especially when the container is subjected to extensive movement, either sporadically or continually, such as via sudden vehicular movement or continual shaking and vibration from road motion. Moreover, certain prior toolboxes will allow the contents to be "mixed up" when the toolbox is rotated vertically or horizontally. Accordingly, certain prior containers of that type are not well suited for use in connection with vehicles. Other prior toolboxes and storage containers which are especially well suited for use with vehicles can be more heavy, expensive, and/or complicated in construction or application.

Objectives of the Invention

Accordingly, a primary objective of the present invention is to provide an improved vehicle storage system especially suited for tools, construction accessories, components, supplies and the like. These improvements include providing such arrangements which:

a. are inexpensive to manufacture, install, maintain, and repair,
b. increase usable space within a vehicle,
c. minimize system weight,
d. increase storage area and accessibility thereto for a vehicle,
e. increase supplemental vehicle features and vehicle functionality,
f. can be readily retrofit onto existing vehicles,
g. do not interfere with co-extensive vehicle features and functions, and.
h. increase the aesthetic appeal of vehicles.

SUMMARY OF THE INVENTION

These and other objectives of the present invention are achieved by the provision of a closable storage container which is slidably and removably mounted in a vehicle tailgate, the cover portion of which can serve as a work surface extension of the tailgate, and the interior of which contains reconfigurable dividing walls for separation of contents into discrete locations during both use and storage. One or more of these containers can be mounted, stacked or side by side, within an interior cavity of the tailgate or of a tailgate segment, that tailgate being lockable and removable from the vehicle. Full extension of the storage container from the tailgate interior can be achieved by a double draw slide mechanism. The tailgate end cover is enlarged for both aesthetic and supplemental support surface purposes.

Other objects, advantages, and novel features of the present invention will become readily apparent from the following drawings and detailed description of certain preferred and alternative embodiments.

BRIEF DESCRIPTION OF THE DRAWINGS

The drawings are not to scale from one figure to the next.

FIG. 1 is a top, schematic view of a pick-up truck type of vehicle incorporating a preferred embodiment of the present invention therein.

FIG. 2 is an upper, rear right side perspective view of a vehicle tailgate incorporating a preferred embodiment of the present invention therein, as with the tailgate in a closed or vertical position with respect to a vehicle.

FIG. 3 is an upper, rear right side perspective view of the embodiment of FIG. 2, as with the tailgate in an open or horizontal position with respect to a vehicle, and as with the top cover of the present invention closed.

FIG. 4 is an upper, rear right side perspective view of the embodiment of FIG. 2, as with the tailgate in an open or horizontal position with respect to a vehicle, and as with the top cover of the present invention opened and the closable container in the fully inserted, storage position.

FIG. 5 is an upper, rear right side perspective view of the embodiment of FIG. 2, as with the tailgate in an open or horizontal position with respect to a vehicle, and as with the top cover of the present invention opened and the closable container in the fully extended, usage position, and with the container cover closed.

FIG. 6 is an upper, rear right side perspective view of the embodiment of FIG. 2, as with the tailgate in an open or horizontal position with respect to a vehicle, and as with the top cover of the present invention opened and the closable container in the fully extended, usage position, and with the container cover opened by sliding back into the tailgate interior.

FIG. 7 is a cross sectional view of an upper portion of the tailgate, as with the top cover closed and locked and the closable container in the fully inserted, storage position.

FIG. 8 is an enlarged upper, rear right side perspective view of a portion of the embodiment of FIG. 6, with the container cover partially opened.

FIG. 9 is an enlarged right side view of an upper portion of the tailgate of FIG. 8.

FIG. 10 is an upper, rear right side perspective view of an alternative embodiment of the present invention corresponding to the orientation of FIG. 2, wherein the container cover is hinged to the closable container and fully opened.

DETAILED DESCRIPTION OF PREFERRED EMBODIMENTS

The drawings show, as numbered figures, certain best versions of embodiments of the present invention, particularly as applied to the tailgate of a pick-up truck, although various other types of tailgates are contemplated for corresponding use with the present invention. Further, as indicated in the priority provisional patent application, the present invention can be applied to "side gates" or movable side walls of a vehicle, and other wall structures where a hollow body is moved from a generally vertical to a generally horizontal position, as between storage and use positions of items retained by the closable container of the present invention mounted within that hollow body.

The following features are illustrated in the drawings by these numerals:

10. A vehicle, such as a pick-up truck,
12. The front of vehicle 10, as where an engine is contained,
14. The cab or passenger compartment of vehicle 10,
16. The cargo bed of vehicle 10, typically rearward of cab 14,
18. The left side of vehicle 10, as defining a side wall of cargo bed 16,
19. The right side of vehicle 10, as defining a side wall of cargo bed 16,
20. The tailgate of vehicle 10, as defining an openable rear wall of cargo bed 16 and, as needed, a rearward extension of cargo bed 16, especially when vehicle 10 is not in motion, and the cargo bed is usable as a work surface,
22. A top cover or closure for the interior space of tailgate 20, which (in especially preferred embodiments) is preferably a flat surface which can serve as a vertical work or support surface when tailgate 20 is in a vertical or closed orientation with respect to cargo bed 16,
24. The front facing surface or wall of tailgate 20,
25. The rear facing surface or wall of tailgate 20, spaced apart from wall 24 to define therebetween an interior space of tailgate 20, preferably opening toward top cover 22,
26. The bottom of tailgate 20, spanning walls 24 and 25,
28. The left wall of tailgate 20, spanning walls 24 and 25,
29. The right wall of tailgate 20, spanning walls 24 and 25,
30. A lock member, preferably keyed in a conventional manner, to selectively secure top cover 22 against unauthorized opening,
31. An interior lock latch or flange, preferably selectively engagable with structure of the interior space of tailgate 22 in a conventional manner, in response to actuation of lock member 30,
32. Hinge pin opening in tailgate 22 for rotatable connection of tailgate 22 to vehicle 10 in a conventional manner, and preferably in a conventional manner which permits tailgate 22 to be removable from vehicle 10,
34. Latch pin or flange opening in tailgate 22 for selective retention of tailgate 22 in a vertical orientation with respect to vehicle 10, according to conventional methods and equipment,
36. A conventional latch, preferably lockable, for actuation of latching pins of flanges to control retention of tailgate 22 in a vertical orientation with respect to vehicle 10, such as to open or close access to cargo bed 16,
38. A conventional back-up camera or other safety device mounted to tailgate 22 and using space within the interior of the tailgate, preferably spaced apart from the space needed by the present invention through dimensional extension of the upper portion of tailgate 22, according to the aesthetic design of the present invention shown in FIG. 2,
39. An exemplary decorative logo, of a conventional nature,
40. The opening edge of top cover 22, preferably extending over a portion of wall 24 when the top cover is in a closed position,
50. A closable container dimensioned to fit within the interior of tailgate 22,
52. A first slide member, secured to container 50, and preferably of a conventional drawer slide nature,
54. A second slide member, secured to first slide member 52, and preferably to a conventional drawer slide member mounted to the interior of tailgate 22,
56. A cover for container 50, preferably close fitting when in a close position over container 50, such that articles within container 50 are not permitted to fall out of container 50 as tailgate 22 moves between various positions and as vehicle 10 is subject to various motive forces during travel,
58. A tray portion of container 50, for receiving and supporting various articles, such as tools, parts, equipment, supplies, and the like,
60. Dividing walls, received and supported on tray portion 58, for partitioning tray portion 58 and/or defining a plurality of cavities in tray portion 58 to receive and support the articles to be stored in container 50, these dividing walls preferably being removable and reconfigurable as desired by the user in conventional manners,
62. Exemplary tabs on dividing walls 60 for penetrating tray portion 58 and/or otherwise being attached thereto in a conventional manner to selectively secure dividing walls 60 to tray portion 58, 64. A slide rail attached to container 50 for slidably securing cover 56 to container 50, 66. A side flange of cover 56 slidably engaging side rail 64, 68. A hinge connected between top cover 22 and rear wall 25, 70. An alternative cover for container 50 which can open upward from tailgate 22, rather than slide into it, in order to provide access to the contents of container 50, and 72. A hinge connecting cover 70 with container 50.

In general, the present invention provides greater usable space in vehicle 10 by providing a storage system inside of either an existing tailgate cavity or an enlarged tailgate cavity, according to the pre-existing tailgate structure of particular application. Preferably, the entire lateral span of the tailgate across the vehicle width is used for container 50. However, in particular embodiments, multiple containers 50 can be mounted side by side across that lateral span. Similarly, where a laterally sectioned tailgate is employed, as shown in U.S. Pat. No. 9,994,263, the present invention can be mounted into one or more of those tailgate sections.

Also, the tailgate depth, front to rearward with respect to vehicle 10, can be altered as desired, so as to create greater storage area, and in that regard, container 50 can have a substantially greater depth or tray capacity than in the embodiments shown. Alternatively in those embodiments, multiple containers 50 can be stacked upon each other, as desired.

Preferably, drawer slides are used to mount container 50 to the interior of tailgate 22 which will allow container 50 to be removably attached to the drawer slides, in a conventional manner. Thus, containers 50 can be readily taken from vehicle for long term security, resupply, repair, and/or greater ease of modification of the configuration of dividing walls 60. Further, since tailgate 22 is designed to be readily detachable in a conventional manner, the present invention can be easily retrofit into many different pre-existing vehicles and applications.

Although the present invention has been shown and described herein with respect to certain preferred embodiments and alternative configurations, those were by way of illustration and example only. For example, sliding and hinged cover assemblies have been shown for closure of container 50, but it will be readily understood from this disclosure that various alternative closure assemblies, such as snap-on lids, can be used within the scope of the present invention. Similarly, while multiple locks 30 are shown, a single lock may suffice for security in a given embodiment.

Accordingly, the spirit and scope of the present invention is intended to be limited only by the terms of the appended claims.

What is claimed is:

1. A utility container system, mountable within a vehicle tailgate, comprising:
   a closable container, slidably mountable within the tailgate so as to be alternatively enclosed within the tailgate or project substantially outward from the tailgate,
   wherein:
   the tailgate includes a top surface when the tailgate is in a closed position on the vehicle, and that top surface serves as a side surface when the tailgate is in an open position on the vehicle,
   the tailgate is formed to have an interior space,
   the top surface is movably connected to the tailgate so as to expose the interior of the tailgate, and
   the top surface is selectively lockable to the tailgate.

2. A utility container system, mountable within a vehicle tailgate, comprising:
   a closable container, slidably mountable within the tailgate so as to be alternatively enclosed within the tailgate or project substantially outward from the tailgate,
   wherein:
   the tailgate includes a top surface when the tailgate is in a closed position on the vehicle, and that top surface serves as a side surface when the tailgate is in an open position on the vehicle,
   the tailgate is formed to have an interior space,
   the top surface is movably connected to the tailgate so as to expose the interior of the tailgate,
   the closable container is mounted to be slidable, at least in part, out of the interior of the tailgate when the top surface is moved to expose the interior of the tailgate, and
   the closable container comprises:
      a tray portion, defining a cavity for receiving and supporting articles therein, and
      a cover portion, connected to the tray portion, for enclosing the cavity, and thereby restricting removal of articles therein when the vertical or horizontal orientation of the closable container changes, and
   wherein the cover portion is movably connected to the tray portion between open and closed positions, the closed position enclosing the cavity, and the open position giving access to the cavity for removal of articles therein.

3. The system according to claim 2 wherein the cover portion is hinged to the tray portion, so as to be rotatable away from the cavity when the cover portion is in an open position.

4. The system according to claim 2 wherein the cover portion is slidably connected to the tray portion, so as to move back into the tailgate interior when the cover portion is in an open position.

5. The system according to claim 2 wherein the closable container is removably connected to the tailgate.

6. The system according to claim 2 wherein the tray portion includes a plurality of dividing walls which partition the cavity into discrete areas to retain different articles therein.

7. The system according to claim 6 wherein the dividing walls are reconfigurable within the tray portion so as to allow different arrays of discrete areas to be employed within the tray.

8. The system according to claim 2 wherein the interior space of the tailgate is substantially larger than the closable container, such that other items can be stored inside of the tailgate in addition to the closable container.

9. The system according to claim 8 wherein a plurality of the closable containers are mounted within the interior space of the tailgate.

10. The system according to claim 2 wherein the tailgate is attached to the bed of a pick-up truck, but does not span the entire rear opening of the pickup truck.

11. The system according to claim 2 wherein the closable container provides a supplemental work surface when extended from the tailgate.

* * * * *